United States Patent
Sugiyama et al.

(10) Patent No.: US 11,732,331 B2
(45) Date of Patent: Aug. 22, 2023

(54) NI-BASED ALLOY, AND NI-BASED ALLOY PRODUCT AND METHODS FOR PRODUCING THE SAME

(71) Applicant: DAIDO STEEL CO., LTD., Nagoya (JP)

(72) Inventors: Kenji Sugiyama, Nagoya (JP); Masashi Nagaya, Nagoya (JP); Yusuke Kusafuka, Nagoya (JP); Yoshihiko Koyanagi, Nagoya (JP); Hiroyuki Takabayashi, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 0 days.

(21) Appl. No.: 17/329,985

(22) Filed: May 25, 2021

(65) Prior Publication Data
US 2021/0371958 A1 Dec. 2, 2021

(30) Foreign Application Priority Data

May 26, 2020 (JP) ................................ 2020-091747

(51) Int. Cl.
| | | |
|---|---|---|
| C22C 19/05 | (2006.01) | |
| C22C 1/04 | (2023.01) | |
| C22F 1/10 | (2006.01) | |
| B22F 9/08 | (2006.01) | |

(52) U.S. Cl.
CPC ............ *C22C 19/052* (2013.01); *B22F 9/082* (2013.01); *C22C 1/0433* (2013.01); *C22C 19/05* (2013.01); *C22F 1/10* (2013.01)

(58) Field of Classification Search
CPC ..... C22C 19/053; C22C 19/05; C22C 1/0433; C22F 1/10
See application file for complete search history.

(56) References Cited

U.S. PATENT DOCUMENTS

| | | |
|---|---|---|
| 3,015,558 A | 1/1962 | Grant et al. |
| 2005/0129567 A1 | 6/2005 | Kirchheiner et al. |
| 2009/0016926 A1 | 1/2009 | Kirchheiner et al. |
| 2019/0106770 A1 | 4/2019 | Kirchheiner et al. |

FOREIGN PATENT DOCUMENTS

| | | |
|---|---|---|
| CN | 1742106 A | 3/2006 |
| DE | 195 08 069 C1 | 5/1996 |
| JP | H01-273693 A | 11/1989 |
| JP | H10-72642 A | 3/1998 |
| JP | 2002-220632 A | 8/2002 |
| JP | 2007-154213 A | 6/2007 |
| JP | 2011-162803 A | 8/2011 |
| JP | 2013-046928 A | 3/2013 |
| WO | WO 2005/040439 A1 | 5/2005 |
| WO | WO 2018/221560 A1 | 12/2018 |

OTHER PUBLICATIONS

P.J. Zhou, J.J. Yu, X.F. Sun, H.R. Guan, Z.Q. Hu, The role of boron on a conventional nickel-based superalloy, Materials Science and Engineering: A, vol. 491, Issues 1-2, 2008, pp. 159-163, ISSN 0921-5093, https://doi.org/10.1016/j.msea.2008.02.019.*
Metallographic Research of Superalloys, Yulin Cai et al., National Defense Industry Press, Apr. 30, 1986, p. 138
"Metal Materials Science", Wenjiang Qiang, et al., Metallurgical Industry Press, Sep. 30, 2016, p. 159.
Chinese Office Action, dated Mar. 15, 2022, in Chinese Application No. 202110578161.9 and English Translation thereof.
Extended European Search Report dated Sep. 22, 2021 for European Patent Application No. 21175985.7-1103.
Chinese Office Action dated Aug. 18, 2022, in corresponding Chinese Patent Application No. 202110578161.9, with an English translation thereof.

* cited by examiner

*Primary Examiner* — Jessee R Roe
(74) *Attorney, Agent, or Firm* — McGinn I.P. Law Group, PLLC.

(57) ABSTRACT

The present invention relates to an Ni-based alloy which is excellent in terms of wear resistance and high-temperature corrosion resistance and which includes $0.3 \leq C \leq 1.0$ mass %, $36.0 \leq Cr \leq 50.0$ mass %, and $3.0 \leq Al \leq 7.0$ mass %, with the balance being Ni and unavoidable impurities, and relates to an Ni-based alloy product made of the Ni-based alloy according to the present invention, and methods for producing the Ni-based alloy product.

5 Claims, No Drawings

NI-BASED ALLOY, AND NI-BASED ALLOY PRODUCT AND METHODS FOR PRODUCING THE SAME

TECHNICAL FIELD

The present invention relates to an Ni-based alloy, an Ni-based alloy product, and methods for producing the Ni-based alloy product. More particularly, the present invention relates to an Ni-based alloy excellent in terms of wear resistance and high-temperature corrosion resistance, an Ni-based alloy product made of this Ni-based alloy, and methods for producing the Ni-based alloy product.

BACKGROUND ART

Martensitic materials having a high C content and a high material hardness are in extensive use as portions where wear is problematic, such as the sliding portions of machine components and surfaces of cutting tools. This is because the higher the material hardness, the better the wear resistance. There are often cases where for the purpose of attaining a reduction in the cost of members, an alloy having excellent wear resistance is deposited only on surfaces of members by overlay welding, etc.

Meanwhile, the valves and fuel injection nozzles of diesel engines for ships, members for petrochemical plants, etc. are required to have excellent high-temperature corrosion resistance (e.g., V-attack resistance, S-attack resistance, and metal dusting resistance) in addition to high-temperature wear resistance.

For example, the diesel engine for ships mainly employs heavy oil as a fuel and outputs power by the explosive combustion of heavy oil. During the combustion stroke, the exhaust valves of the diesel engine are closed, and the fire-contact surface of each exhaust valve is exposed to the high-temperature combustion gas and the valve-seat-side surface thereof is in the state of being in contact with the valve seat. In the subsequent exhaust stroke, the exhaust valves are opened to discharge the exhaust gas through the gaps between the valve-seat-side surfaces and the valve seats.

The portion of each exhaust valve which is exposed to a highest temperature is around the center of the fire-contact surface, the highest temperature being 650° C.-700° C. Because of this, the material of the fire-contact surface needs to be excellent in terms of heat resistance and high-temperature corrosion resistance. Meanwhile, the valve-seat-side surface, although not heated to so high a temperature, repeatedly undergoes contact with the valve seat in a corrosive environment. Because of this, the material of the valve-seat-side surface needs to have a high hardness and excellent wear resistance.

Various proposals have hitherto been made on materials and members for use in such applications where wear resistance, heat resistance, and high-temperature corrosion resistance are required.

For example, Patent Document 1 discloses a process for producing an engine-exhaust valve for large ships, which includes (a) depositing a welding material constituted of an Ni—Cr—Al aging precipitation type Ni-based alloy on a round rod of an austenitic heat-resistant steel by overlay wielding so as to cover an end of the round rod, (b) subjecting the end portion to hot die-forging to form a mushroom-shaped portion, and (c) subjecting the work to a solution heat treatment and an aging precipitation heat treatment.

The document indicates that the process yields microfined α-Cr phase grains and this can inhibit the abnormal growth of a γ'-phase during high-temperature use.

Patent Document 2 discloses a powdery alloy for thermal spraying which contains given amounts of Cr, Al, and Fe, with the balance being Ni and unavoidable impurities.

The document indicates that (A) addition of Fe to an Ni—Cr—Al alloy promotes the cellular precipitation of a lamellar structure including an α-Cr phase, which is a solid solution phase of Cr, and a γ/γ'-phase formed by the fine precipitation of a γ'-phase within a γ-phase and that (B) this cellular precipitation brings about excellent resistance to wear and high-temperature corrosion.

Patent Document 3 discloses an Ni-based alloy including 3 mass % of C, 40 mass % of Cr, and 6 mass % of Al, with the balance being Ni and unavoidable impurities.

This document indicates that addition of Al to an Ni—Cr—C alloy changes the amount of $M_7C_3$ carbides (Cr-based carbides) to be formed by crystallization and thus gives a hypereutectic structure, resulting in improvements in hardness, high-temperature strength, and high-temperature wear resistance.

Patent Document 4 discloses a wear-resistant alloy which (a) includes 1.0 wt %-3.0 wt % of C and 12 wt %-50 wt % of Cr, with the balance being Ni and (b) has a rod-shaped chromium carbide, the content of the chromium carbide being 10%-28.5% in terms of areal proportion, and in which (c) the matrix of the alloy has a chromium content of 10 wt % or higher.

This document indicates that both satisfactory wear resistance and impact resistance can be attained by dispersing a relatively large chromium carbide in a soft matrix and optimizing the amount of the chromium carbide.

Patent Document 5 discloses an overlay welding material which includes given amounts of C, Si, Cr, (Al+Ti), and N and further includes a given amount of at least one element selected from the group consisting of Mn, V, Nb, Mo, W, and Fe, with the balance being Ni and unavoidable impurities.

This document indicates that an overlay welding material combining sufficient high-temperature V-corrosion resistance and S-corrosion resistance with wear resistance is obtained by optimizing the content of each component.

Furthermore, Patent Document 6 discloses an Ni-based alloy including given amounts of C, Cr, Al, and V, with the balance being Ni and unavoidable impurities.

This document indicates that an Ni-based alloy which is equal or superior in wear resistance to existing high-carbon martensitic stainless steels is obtained by regulating the chemical composition so that it is possible to disperse grains having higher hardness than that of the α-phase and having a size of about several micrometers.

As described in Patent Document 1, the exhaust valves of an engine for ships are generally each configured of an inexpensive austenitic heat-resistant steel as a main body and a material excellent in terms of wear resistance and/or V-attack resistance, which has been bonded to the main body by overlay welding to constitute portions to be exposed to severest environments. However, none of the conventional overlay welding alloys simultaneously satisfies the high wear resistance required of the valve-seat-side surfaces and the high high-temperature corrosion resistance (V-attack resistance) required of the fire-contact surfaces. Because of this, for obtaining an exhaust valve having both improved wear resistance and improved high-temperature corrosion resistance using conventional overlay welding alloys, it is necessary to overlay-weld an alloy having excellent wear resistance (e.g., a Stellite alloy) to form a valve-seat-side surface, which is required to have wear resistance, and to overlay-weld an alloy having excellent high-temperature corrosion resistance (e.g., an Ni-based aging hardening type alloy) to form a fire-contact surface, which is required to have high-temperature corrosion resistance.

However, in cases where two alloys having quite different compositions are overlay-welded in producing one exhaust valve and a heat treatment, e.g., age hardening, is thereafter conducted under heat treatment conditions selected so that either of the alloys comes to have maximized properties, then the other alloy comes to have reduced properties. For avoiding this problem, it is necessary that both the properties required of the valve-seat-side surface and the fire-contact surface and the properties of the two overlay welding alloys should be taken into account to perform the heat treatment under conditions which result in a satisfactory balance among those properties. There is hence a problem in that the best properties of the two overlay welding alloys cannot be utilized and the exhaust valve itself has reduced performance.

In order to overcome this problem, Patent Document 2 proposes to add a given amount of Fe to an Ni—Cr—Al alloy to simultaneously improve wear resistance and high-temperature corrosion resistance. However, from the standpoint of further improving the performance of the exhaust valves, it is desired to further improve the wear resistance and high-temperature corrosion resistance of an overlay welding alloy.

Patent Document 1: JP-A-2013-046928
Patent Document 2: JP-A-2011-162803
Patent Document 3: JP-A-2002-220632
Patent Document 4: JP-A-H10-072642
Patent Document 5: JP-A-H01-273693
Patent Document 6: International Publication WO 2018/221560

SUMMARY OF THE INVENTION

A problem to be solved in the present invention is to provide an Ni-based alloy which comes to have excellent wear resistance and high-temperature corrosion resistance upon a heat treatment.

Another problem to be solved in the present invention is to provide an Ni-based alloy product including the Ni-based alloy and method for producing the Ni-based alloy product.

Namely, the present invention relates to the following configurations (1) to (9).
(1) An Ni-based alloy including:
   $0.3 \leq C \leq 1.0$ mass %;
   $36.0 \leq Cr \leq 50.0$ mass %; and
   $3.0 \leq Al \leq 7.0$ mass %,
   with the balance being Ni and unavoidable impurities.
(2) The Ni-based alloy according to (1), further including at least one element selected from the group consisting of:
   $Mo \leq 2.0$ mass %;
   $W \leq 2.0$ mass %;
   $Fe \leq 5.0$ mass %; and
   $Cu \leq 2.0$ mass %.
(3) The Ni-based alloy according to (1) or (2), further including
   $0.0005 \leq B \leq 0.0100$ mass %.
(4) The Ni-based alloy according to any one of (1) to (3), further including at least one element selected from the group consisting of:
   $Nb \leq 1.0$ mass %;
   $Ti \leq 1.0$ mass %;
   $V \leq 0.5$ mass %;
   $Ta \leq 0.5$ mass %;
   $Zr \leq 0.1$ mass %; and
   $Hf \leq 0.1$ mass %.
(5) An Ni-based alloy product made of the Ni-based alloy according to any one of (1) to (4).
(6) The Ni-based alloy product according to (5), which is in a form of powder.
(7) The Ni-based alloy product according to (5), which is a rod-shaped object or a linear object.
(8) A method for producing an Ni-based alloy product, the method including:
   a raw-material mixing and melting step of mixing and melting raw materials that have been put together so as to obtain the Ni-based alloy according to any one of (1) to (4) to form a melt; and
   an atomization step of atomizing the melt to obtain an Ni-based alloy product which is in a form of powder.
(9) A method for producing an Ni-based alloy product, the method including:
   a raw-material mixing and melting step of mixing and melting raw materials that have been put together so as to obtain the Ni-based alloy according to any one of (1) to (4) to form a melt;
   a casting step of casting the melt to form a cast; and
   a hot working step of hot-working the cast to obtain an Ni-based alloy product which is a rod-shaped object or a linear object.

In cases where a relatively large amount of C is added to an Ni—Cr—Al alloy and the resultant alloy is heat-treated under appropriate conditions, a Cr-based carbide can be precipitated in the matrix of the alloy. As a result, this alloy has improved wear resistance as compared with alloys having low C contents.

Meanwhile, the precipitation of a Cr-based carbide reduces the concentration of Cr in the matrix, resulting in reduced high-temperature corrosion resistance. However, in cases where the Ni—Cr—Al alloy to which C has been added in a relatively large amount is made to have a relatively increased Cr content, it is possible to inhibit a decrease in the Cr concentration of the matrix caused by the precipitation of the Cr-based carbide. As a result, both high wear resistance and high high-temperature corrosion resistance can be attained on a high level.

DESCRIPTION OF EMBODIMENTS

Embodiments for carrying out the present invention are described in detail below.

1. Ni-Based Alloy

[1.1. Main Constituent Elements]
The Ni-based alloy according to the present invention includes the following elements, with the balance being Ni and unavoidable impurities. The kinds of the constituent elements, ranges of the contents of the components, and reasons for the content ranges are as follows.
(1) $0.3 \leq C \leq 1.0$ mass %:
C is an element necessary for forming carbides and contributes to material hardness enhancement. In the case where the content of C is too low, carbides do not sufficiently crystallize out during solidification, making it impossible to obtain a sufficient hardness. Consequently, the content of C needs to be 0.3 mass % or higher. The content of C is preferably 0.5 mass % or higher, more preferably 0.6 mass % or higher.

Meanwhile, in the case where the content of C is too high, coarse carbides crystallize out, resulting in material embrittlement. Consequently, the content of C needs to be 1.0 mass % or less. The content of C is preferably 0.9 mass % or less, more preferably 0.8 mass % or less.

(2) 36.0≤Cr≤50.0 mass %:

Cr is an element necessary for forming Cr-based carbides and contributes to material hardness enhancement. Cr is a main element for forming an α-Cr phase. In cases where an Ni-based alloy containing Cr in a given amount is aged, an α-Cr phase and a γ'-phase compositely precipitate as lamellar state to contribute to increases in strength and hardness. Furthermore, Cr forms protective coating films on surfaces of materials in various corrosive environments to remarkably contribute to an improvement in high-temperature corrosion resistance.

Cr-based carbides can be formed even in cases where the content of Cr is low. However, in the case where the content of Cr is too low, the lamellar structure cannot be stably formed throughout the whole region of material by an aging treatment, resulting in enhanced unevenness in hardness and insufficient hardness. Consequently, the content of Cr needs to be 36.0 mass % or higher. The content of Cr is preferably 40.0 mass % or higher, more preferably 42.0 mass % or higher.

Meanwhile, in the case where the content of Cr is too high, the content of Ni is too low accordingly, resulting in insufficient precipitation of a γ'-phase. Consequently, the content of Cr needs to be 50.0 mass % or less. The content of Cr is preferably 48.0 mass % or less, more preferably 46.0 mass % or less.

The Ni-based alloy according to the present invention can attain excellent wear resistance and high-temperature corrosion resistance because of the lamellar structure including an α-Cr phase and a γ'-phase (the lamellar structure being precipitated in the matrix by an aging treatment) and because of the Cr-based carbides. Since Cr is an element which forms both carbides and an α-Cr phase, it is preferred to take account of a balance between the C content and the Cr content. Specifically, it is preferable that the C content and the Cr content are taken into account so that the alloy in a 600° C. equilibrium state has an α-Cr phase proportion by volume of 0.15 or higher. The volume proportion thereof is preferably 0.18 or higher, more preferably 0.20 or higher. This volume proportion may be a value calculated with a thermodynamic calculation software (e.g., Thermo-Calc 2020a), and the calculated value may be one determined through a calculation concerning four elements of C, Cr, Al, and Ni.

(3) 3.0≤Al≤7.0 mass %:

Al is a crucially important element which combines with Ni to thereby form a γ'-phase, which is crucially important for high-temperature strength. Al contributes also to improvements in high-temperature corrosion resistance and oxidation resistance. For obtaining such effects, the content of Al needs to be 3.0 mass % or higher. The content of Al is preferably 3.3 mass % or higher, more preferably 3.5 mass % or higher.

Meanwhile, in the case where the content of Al is too high, a γ'-phase precipitates in too large an amount, and this not only considerably reduces the producibility but also results in a decrease in material toughness/ductility. Consequently, the content of Al needs to be 7.0 mass % or less. The content of Al is preferably 6.0 mass % or less, more preferably 4.5 mass % or less.

[1.2. Optional Constituent Elements]

Besides including the main constituent elements described above, the Ni-based alloy according to the present invention may further contain one or more elements such as those shown below. The kinds of the optional elements, ranges of the contents of the components, and reasons for the content ranges are as follows.

(4) Mo≤2.0 mass %:

Mo serves as a solid-solution-strengthening element to contribute to an improvement in material hardness and is effective in further improving the wear resistance. Mo can be added according to need.

However, in the case where the content of Mo is too high, this results in a decrease in suitability for overlay welding, suitability for additive manufacturing, and/or castability. Consequently, the content of Mo is preferably 2.0 mass % or less. There is no particular lower limit on Mo content, and the content of Mo may be zero.

(5) W≤12.0 mass %:

Like Mo, W serves as a solid-solution-strengthening element to contribute to an improvement in material hardness and is effective in further improving the wear resistance. W can be added according to need.

However, in the case where the content of W is too high, this results in a decrease in suitability for overlay welding, suitability for additive manufacturing, and/or castability. Consequently, the content of W is preferably 2.0 mass % or less. There is no particular lower limit on W content, and the content of W may be zero.

(6) Fe≤5.0 mass %:

Fe is inexpensive as compared with Ni and can hence be added for the purpose of reducing the material cost. However, in the case where the content of Fe is too high, the high-temperature corrosion resistance decreases. It is hence preferable that the content of Fe is 5.0 mass % or less. The content of Fe is preferably 4.0 mass % or less, more preferably 1.0 mass % or less.

(7) Cu≤2.0 mass %:

Cu has the effect of accelerating the precipitation of an α-Cr phase, depending on the addition amount thereof, and can be added according to need.

However, in the case where the content of Cu is too high, this results in a decrease in suitability for overlay welding and/or suitability for additive manufacturing. Consequently, the content of Cu is preferably 2.0 mass % or less. Even with no Cu, it is possible to sufficiently precipitate an α-Cr phase by, for example, a heat treatment. There is hence no particular lower limit on Cu content, and the content of Cu may be zero.

(8) 0.0005≤B≤0.0100 mass %:

B has the effect of segregating at grain boundaries, thereby improving the strength of the grain boundaries. In the case where the Ni-based alloy is for use as a thermal-spraying powder, B has the effect of lowering the viscosity of the molten metal during thermal spraying. The reduction in the viscosity of the molten metal enhances the substrate-wetting properties or improves adhesion between the substrate and the coating film or between coating films. From the standpoint of obtaining such effects, the content of B is preferably 0.0005 mass % or higher.

Meanwhile, in the case where the content of B is too high, borides segregate at grain boundaries and this rather results in a decrease in grain-boundary strength. It is hence preferable that the content of B is 0.0100 mass % or less. The content of B is preferably 0.0050 mass % or less, more preferably 0.0030 mass % or less.

(9) Nb≤1.0 mass %, (10) Ti≤1.0 mass %, (11) V≤0.5 mass %, (12) Ta≤0.5 mass %, (13) Zr≤0.1 mass %, (14) Hf≤0.1 mass %:

These elements are carbide-forming elements and have the effect of further improving the hardness by combining with C. These elements can be added according to need.

However, in the case where the contents of those elements are too high, there is a possibility that those elements might combine with nitrogen, oxygen, or sulfur to form harmful impurities. Consequently, the contents of those elements are preferably not higher than the upper limits shown above.

Any one of those elements may be added or two or more thereof may be added. There is no particular lower limit on the content of each element, and the content thereof may be zero.

[1.3. Unavoidable Impurities]

The term "unavoidable impurities" in the present invention means trace components which have come into the Ni-based alloy from raw materials or from the refractory in producing the Ni-based alloy. In the present invention, in cases where the following components are contained in the amounts shown below, these components are regarded as unavoidable impurities. Si≤0.5 mass %, Mn≤1.0 mass %, P≤0.05 mass %, S≤0.05 mass %, H≤0.002 mass %, O≤0.01 mass %, N≤0.1 mass %, Sn≤0.1 mass %, Pb≤0.01 mass %, Bi≤0.1 mass %, Zn≤0.01 mass %, Ga≤0.01 mass %, Ge≤0.01 mass %, Se≤0.01 mass %, In≤0.01 mass %, Sb≤0.01 mass %, Te≤0.01 mass %, and Ag≤0.01 mass %.

[1.4. Metallographic Structure]

[1.4.1 Oxide Coating Film]

A protective coating film on material surfaces plays an important role in ensuring high-temperature corrosion resistance. Effective as the protective coating film are oxides, in particular $Cr_2O_3$. Stainless steels show high high-temperature corrosion resistance since the Cr contained in the matrix phase forms a protective coating film of $Cr_2O_3$ in high-temperature corrosive environments. This formation of such protective coating film occurs also in the Ni-based alloy according to the present invention.

In cases where the Ni-based alloy according to the present invention is used to produce various members, the members just after the production usually have no oxide coating film on the surfaces thereof. However, since the Ni-based alloy according to the present invention contains Cr in a relatively large amount, use of the members, which are made of the Ni-based alloy of the present invention, in a high-temperature oxidizing atmosphere results in the formation of an oxide coating film including $Cr_2O_3$ as a main component on the surfaces of the members. Because of this, the Ni-based alloy according to the present invention can be used as members themselves which are required to have V-attack resistance, such as the exhaust valves of engines for ships, or as overlay weld layers which cover surfaces of such members.

[1.4.2. Lamellar Structure]

From the standpoint of wear resistance, material hardness at use environment temperatures is important. Various techniques including precipitation strengthening and solid-solution strengthening are known as techniques for strengthening materials. In the case of Ni-based alloys, precipitation strengthening is usually employed. Since Ni-based alloys have a matrix phase containing a sufficient amount of Ni, a γ'-phase constituted of $Ni_3Al$ can be precipitated by adding an appropriate amount of Al to such Ni-based alloy and subjecting the alloy to a solution heat treatment and an aging treatment under appropriate conditions.

Since the Ni-based alloy according to the present invention is made up of optimized components, this Ni-based alloy, when heat-treated under appropriate conditions, comes to have a lamellar structure formed therein by the precipitation of a γ'-phase and an α-Cr phase as layers. Because of this, the Ni-based alloy hardens remarkably upon heat treatment to come to have excellent wear resistance. Furthermore, since C also has been incorporated in an appropriate amount, Cr carbides crystallize out and precipitate in the matrix phase. Thus, a further increase in hardness is attained.

2. Ni-Based Alloy Product

[2.1. Composition]

The Ni-based alloy product according to the present invention is made of the Ni-based alloy according to the present invention. An explanation thereon is omitted since details of the Ni-based alloy are as described above.

[2.2. Shapes]

The term "product" in the present invention means an article having a specific shape for use in a specific application. Examples of the product include various raw materials and product articles (including semifinished product articles), such as, for example, powders, rod-shaped objects, linear objects, cast articles having given shapes, and forged articles having given shapes.

[2.3. Applications]

Examples of applications for the powder made of the Ni-based alloy include filler metals for overlay welding, raw-material powders for additive manufacturing, and raw-material powders for powder metallurgy.

Examples of applications for the rod-shaped object or linear object made of the Ni-based alloy include filler-metal rods for overlay welding and raw-material rods for additive manufacturing.

In the case of conducting overlay welding using the powder, rod-shaped object, or linear object, methods for the overlay welding are not particularly limited. Examples of overlay welding methods include a laser overlay welding method and a PTA overlay welding method.

In the case of conducting additive manufacturing using the powder, rod-shaped object, or linear object, methods for the additive manufacturing are not particularly limited. Examples of additive manufacturing methods include an electron beam irradiation heating method and a laser irradiation heating method.

In the case where the powder, rod-shaped object, or linear object made of the Ni-based alloy according to the present invention is used to conduct overlay welding or additive manufacturing, there are often cases where in the resultant weld or shaped article in the as-welded state or as-shaped state, a lamellar structure including a γ'-phase ($Ni_3Al$) and an α-Cr phase has not been sufficiently formed in the matrix constituted of a γ-phase (Ni solid solution).

It is hence preferable that the article produced by the overlay welding or additive manufacturing is subjected to an aging treatment for hardness regulation. Furthermore, a heat treatment for strain or stress removal, etc. may be additionally performed.

3. Production Method (1) for Ni-Based Alloy Product: Method for Producing Powder A method for producing an Ni-based alloy product according to a first embodiment of the present invention includes:

a raw-material mixing and melting step of mixing and melting raw materials that have been put together so as to obtain an Ni-based alloy according to the present invention to form a melt; and an atomization step of atomizing the melt to obtain an Ni-based alloy product which is in a form of powder according to the present invention.

[3.1. Raw-Material Mixing and Melting Step]

First, raw materials that have been put together so as to obtain an Ni-based alloy according to the present invention are mixed and melted to form a melt (raw-material mixing and melting step). Methods for mixing the raw materials and methods for melting the raw materials are not particularly limited, and various methods can be used. A suitable melting method is, for example, a vacuum melting method. The melting method may be used in combination with a vacuum decarburization method or the like to refine the melt.

[3.2. Atomization Step]

Next, the melt is atomized to obtain a powder according to the present invention (atomization step). By conducting the atomization step, a rapidly solidified powder of the Ni-based alloy can be obtained from the melt. Methods for the atomization are not particularly limited, and various methods can be used.

For example, in the case of producing a powder for overlay welding, it is preferred to employ a gas atomization method which yields particles that are highly clean, have evenness in composition, and are spherical. Meanwhile, in the case of producing a powder for powder metallurgy, it is preferred to employ a water atomization method which yields a powder including particles of irregular shapes.

After the atomization step, the rapidly solidified alloy powder may be subjected to classification for obtaining particles having desired particle diameters. Although the classification is not always necessary, it is preferred to conduct the classification from the standpoint of improving the usefulness of the rapidly solidified alloy powder. The powder to be obtained by the classification is not particularly limited in its particle diameter. It is, however, preferable from the standpoint of handleability that the rapidly solidified alloy powder is classified so as to result in an average particle diameter of, for example, 10 μm-20 μm.

4. Production Method (2) for Ni-Based Alloy Product: Method for Producing Rod-Shaped Object or Linear Object A method for producing an Ni-based alloy product according to a second embodiment of the present invention includes:

a raw-material mixing and melting step of mixing and melting raw materials that have been put together so as to obtain an Ni-based alloy according to the present invention to form a melt;

a casting step of casting the melt to form a cast; and a hot working step of hot-working the cast to obtain an Ni-based alloy product which is a rod-shaped object or linear object according to the present invention.

[4.1. Raw-Material Mixing and Melting Step]

First, raw materials that have been put together so as to obtain an Ni-based alloy according to the present invention are mixed and melted to form a melt (raw-material mixing and melting step). Details of the raw-material mixing and melting step are the same as in the first embodiment and an explanation thereon is hence omitted.

[4.2. Casting Step]

Next, the melt is cast to form a cast (casting step). Methods for the casting are not particularly limited, and various methods can be used in accordance with intended uses.

[4.3. Hot Working Step]

Next, the cast is hot-worked to obtain a rod-shaped object or linear object according to the present invention (hot working step). Methods for the hot working for forming the rod-shaped object or linear object are not particularly limited. Examples of hot working methods include extrusion and drawing.

The temperature for the hot working is preferably in the range of 1,150° C.-900° C. By subjecting the cast to hot working, casting defects of the cast can be eliminated and coarse structures formed by the casting and solidification can be destroyed. As a result, a rod-shaped or linear object having a dense and fine metallographic structure can be obtained.

5. Effects

The exhaust valves of an engine for ships are generally each configured of an inexpensive austenitic heat-resistant steel as a main body and a material excellent in terms of wear resistance and/or high-temperature corrosion resistance (V-attack resistance, S-attack resistance, and metal dusting resistance), which has been bonded to the main body by overlay welding to constitute portions to be exposed to severest environments. In each of the exhaust valves of the engine for ships, the valve-seat-side surface is required to have high wear resistance and the fire-contact surface is required to have high high-temperature corrosion resistance. However, none of the conventional overlay welding alloys simultaneously satisfies these requirements.

It is thought that this problem may be overcome by overlay-welding an alloy having excellent wear resistance (e.g., a Stellite alloy) to form a valve-seat-side surface, which is required to have wear resistance, and overlay-welding an alloy having excellent high-temperature corrosion resistance (e.g., an Ni-based aging hardening type alloy) to form a fire-contact surface, which is required to have high-temperature corrosion resistance. However, in cases where two alloys having quite different compositions are overlay-welded in producing one exhaust valve and a heat treatment, e.g., aging hardening, is thereafter conducted under heat treatment conditions selected so that either of the alloys comes to have maximized properties, then the other alloy comes to have reduced properties.

This problem can be solved in the following manner. In cases where a relatively large amount of C is added to an Ni—Cr—Al alloy and the resultant alloy is heat-treated under appropriate conditions, a Cr-based carbide can be precipitated in the matrix. As a result, this alloy has improved wear resistance as compared with alloys having low C contents.

Meanwhile, the precipitation of a Cr-based carbide reduces the concentration of Cr in the matrix, resulting in reduced high-temperature corrosion resistance. However, in cases where the Ni—Cr—Al alloy to which C has been added in a relatively large amount is made to have a relatively increased Cr content, it is possible to inhibit a decrease in the Cr concentration of the matrix caused by the precipitation of the Cr-based carbide. As a result, both high wear resistance and high high-temperature corrosion resistance can be attained on a high level.

EXAMPLES

Examples 1 to 21 and Comparative Examples 1 to 8

[1. Production of Samples]
[1.1. Production of Powders and Welding Wires]

Powders having the compositions shown in Table 1 were produced using an Ar gas atomization method. Furthermore, welding wires having the compositions shown in Table 1 were produced using a melting and casting method and a hot working method.

[2. Test Methods]
[2.1. Volume Proportion of α-Cr Phase in 600° C. Equilibrium State]

In each of Examples 1 to 21 and Comparative Examples 1 to 8, the volume proportion of an α-Cr phase in a 600° C. equilibrium state was calculated. The calculation conditions are as follows.
  Calculation software: Thermo-Calc 2020a
  Calculation data base: TCN18:Ni-Alloys v8.2
  Components for calculation: Calculation was made with respect to four elements of C, Cr, Al, and Ni.

TABLE 1

| | Chemical composition (mass %) | | | | | | | | | | | | | | | | |
|---|---|---|---|---|---|---|---|---|---|---|---|---|---|---|---|---|---|
| | C | Si | Mn | Mo | W | Cr | Al | Nb | Ti | Ta | V | Fe | B | Cu | Zr | Hf | Ni |
| Example 1 | 0.7 | — | — | — | — | 44 | 3.8 | — | — | — | — | — | — | — | — | — | Bal. |
| Example 2 | 0.4 | — | — | — | — | 44 | 3.8 | — | — | — | — | — | — | — | — | — | Bal. |
| Example 3 | 0.9 | — | — | — | — | 44 | 3.8 | — | — | — | — | — | — | — | — | — | Bal. |
| Example 4 | 0.7 | 0.4 | — | — | — | 44 | 3.8 | — | — | — | — | — | — | — | — | — | Bal. |
| Example 5 | 0.7 | — | 0.6 | — | — | 44 | 3.8 | — | — | — | — | — | — | — | — | — | Bal. |
| Example 6 | 0.7 | — | — | 1.0 | — | 44 | 3.8 | — | — | — | — | — | — | — | — | — | Bal. |
| Example 7 | 0.7 | — | — | — | 1.0 | 44 | 3.8 | — | — | — | — | — | — | — | — | — | Bal. |
| Example 8 | 0.7 | — | — | — | — | 48 | 3.8 | — | — | — | — | — | — | — | — | — | Bal. |
| Example 9 | 0.5 | — | — | — | — | 39 | 3.8 | — | — | — | — | — | — | — | — | — | Bal. |
| Example 10 | 0.7 | — | — | — | — | 44 | 6.0 | — | — | — | — | — | — | — | — | — | Bal. |
| Example 11 | 0.7 | — | — | — | — | 44 | 3.3 | — | — | — | — | — | — | — | — | — | Bal. |
| Example 12 | 0.7 | — | — | — | — | 44 | 3.8 | 0.5 | — | — | — | — | — | — | — | — | Bal. |
| Example 13 | 0.7 | — | — | — | — | 44 | 3.8 | — | 0.9 | — | — | — | — | — | — | — | Bal. |
| Example 14 | 0.7 | — | — | — | — | 44 | 3.8 | — | — | 0.2 | — | — | — | — | — | — | Bal. |
| Example 15 | 0.7 | — | — | — | — | 44 | 3.8 | — | — | — | 0.2 | — | — | — | — | — | Bal. |
| Example 16 | 0.7 | — | — | — | — | 44 | 3.8 | — | — | — | — | 4 | — | — | — | — | Bal. |
| Example 17 | 0.7 | — | — | — | — | 44 | 3.8 | — | — | — | — | — | 0.001 | — | — | — | Bal. |
| Example 18 | 0.7 | — | — | — | — | 44 | 3.8 | — | — | — | — | — | 0.007 | — | — | — | Bal. |
| Example 19 | 0.7 | — | — | — | — | 44 | 3.8 | — | — | — | — | — | — | 2 | — | — | Bal. |
| Example 20 | 0.7 | — | — | — | — | 44 | 3.8 | — | — | — | — | — | — | — | 0.01 | — | Bal. |
| Example 21 | 0.7 | — | — | — | — | 44 | 3.8 | — | — | — | — | — | — | — | — | 0.01 | Bal. |
| Comparative Example 1 | 1.5 | — | — | — | — | 46 | 3.8 | — | — | — | — | — | — | — | — | — | Bal. |
| Comparative Example 2 | 0.1 | — | — | — | — | 38 | 3.8 | — | — | — | — | — | — | — | — | — | Bal. |
| Comparative Example 3 | 0.6 | — | — | — | — | 32 | 3.6 | — | — | — | — | — | — | — | — | — | Bal. |
| Comparative Example 4 | 0.4 | — | — | — | — | 40 | 2.0 | — | — | — | — | — | — | — | — | — | Bal. |
| Comparative Example 5 | 0.5 | — | — | — | — | 42 | 3.8 | — | 2.6 | — | — | — | — | — | — | — | Bal. |
| Comparative Example 6 | 0.7 | — | — | — | — | 39 | 3.6 | — | — | — | — | 9 | — | — | — | — | Bal. |
| Comparative Example 7 | 1.2 | — | — | — | — | 35 | 2.8 | — | — | — | — | 12 | — | — | — | — | Bal. |
| Comparative Example 8 | 3.0 | — | — | — | — | 44 | 3.8 | — | — | — | — | — | — | — | — | — | Bal. |

[1.2. Production of Test Pieces]
[1.2.1. Overlay Welding Using Powder]

As a base was used a plate material made of SNCrW and having a size of 100 mm×100 mm Using a powder plasma welding (PTA) method, an overlay weld layer having a thickness of 10 mm was formed on a surface of the base. Test pieces having dimensions of 10 mm (length)×10 mm (width)×2 mm (thickness) were cut out of the overlay weld layer. The test pieces obtained were subjected to a 16-hour aging treatment at 600° C.

[1.2.2. Additive Manufacturing]

Using an additive manufacturing device of the powder bed type, an additive manufactured article having dimensions of 15 mm (length)×15 mm (width)×5 mm (thickness) was produced on a base surface. Test pieces having dimensions of 10 mm (length)×10 mm (width)×2 mm (thickness) were cut out of the additive manufactured article. The test pieces obtained were subjected to a 16-hour aging treatment at 600° C.

[1.2.3. Overlay Welding Using Welding Wire]

Test pieces were produced in the same manner as in [1.2.1] except that a welding wire was used to conduct overlay welding.

[2.2. Hardness]

A test piece which had undergone the heat treatment was embedded in a resin, and a surface of the test piece was polished. A micro-Vickers hardness tester was used to measure the hardness under a load of 300 gf.

[2.3. High-Temperature Corrosion Test]

A test piece which had undergone the aging treatment was subjected to a V-attack test in accordance with JIS Z2292: 2004. The test conditions are as follows. After the test, the resultant corrosion scale was removed and the weight of the test piece was then measured. From the difference in weight between before and after the test, a decrease in weight (corrosion loss) per unit area was calculated.
  Test piece dimensions: 10 mm×10 mm×2 mm
  Application amount: 20 mg/cm$^2$
  Test temperature: 800° C.
  Test period: 20 hours
  Salt: 85% $V_2O_5$+$Na_2SO_4$

[3. Results]
[3.1. Volume Proportion of α-Cr Phase and Overlay Welding using Powder]

In Table 2 are shown the volume proportion of an α-Cr phase and the results of the tests of the overlay weld layer formed by overlay welding using each powder.

With respect to suitability for overlay welding, "A" indicates that overlay welding was able to be performed without causing a crack, and "B" indicates that cracking occurred during the overlay welding, making the evaluation impossible.

With respect to wear resistance, "A" indicates that the hardness after the aging treatment was 750 Hv or higher, "B" indicates that the hardness after the aging treatment was 700 Hv or higher but less than 750 Hv, and "C" indicates that the hardness after the aging treatment was less than 700 Hv.

With respect to V-attack resistance, "A" indicates that the corrosion loss was 20 mg/cm$^2$ or less, "B" indicates that the corrosion loss was more than 20 mg/cm$^2$ but not more than 25 mg/cm$^2$, and "C" indicates that the corrosion loss was more than 25 mg/cm$^2$.

The following can be seen from Table 2.

(1) Comparative Example 1 was low in V-attack resistance. This is thought to be because the content of C was too high and, hence, Cr-based carbides precipitated in a large amount, resulting in a reduced Cr concentration in the matrix.

(2) Comparative Example 2 was low in wear resistance. This is thought to be because the content of C was too low and, hence, Cr carbides precipitated in a reduced amount.

(3) Comparative Example 3 was low in wear resistance and V-attack resistance. This is thought to be because the content of Cr was too low and, hence, the formation of a lamellar structure did not occur throughout the whole region of the material in the aging treatment and the material had an insufficient concentration of Cr, which is effective for V-attack resistance.

(4) Comparative Example 4 was low in wear resistance. This is thought to be because the content of Al was too low and, hence, the formation of a lamellar structure did not occur throughout the whole region of the material in the aging treatment.

(5) Comparative Example 5 was low in V-attack resistance. This is thought to be because the Ti, which had been incorporated in excess, combined with nitrogen, oxygen, and sulfur to form impurities.

(6) Comparative Example 6 was low in V-attack resistance. This is thought to be because the material excessively contained Fe, which adversely affects the V-attack resistance.

(7) Comparative Example 7 was low in wear resistance and V-attack resistance. This is thought to be because the material excessively contained Fe, which adversely affects the V-attack resistance, and because the increased Fe content resulted in a relatively reduced Ni content and this inhibited the formation of a lamellar structure in the aging treatment.

(8) Comparative Example 8 suffered cracking during the overlay welding, making the evaluation impossible. This is thought to be because the content of C was too high.

(9) Examples 1 to 21 were each excellent in terms of suitability for overlay welding, wear resistance, and V-attack resistance.

TABLE 2

| | Volume proportion of α-Cr phase | Suitability for overlay welding Evaluation | Wear resistance (hardness) 600° C. aging × 16 hr | | V-attack resistance (corrosion loss) 800° C. × 20 hr, 85% V$_2$O$_5$ + Na$_2$SO$_4$ | |
|---|---|---|---|---|---|---|
| | | | Hv (average for five test pieces) | Evaluation | mg/cm$^2$ | Evaluation |
| Example 1 | 0.25 | A | 770 | A | 19 | A |
| Example 2 | 0.30 | A | 720 | B | 16 | A |
| Example 3 | 0.21 | A | 800 | A | 24 | B |
| Example 4 | 0.25 | A | 780 | A | 18 | A |
| Example 5 | 0.25 | A | 772 | A | 22 | B |
| Example 6 | 0.25 | A | 785 | A | 22 | B |
| Example 7 | 0.25 | A | 790 | A | 21 | B |
| Example 8 | 0.30 | A | 790 | A | 15 | A |
| Example 9 | 0.21 | A | 730 | B | 22 | B |
| Example 10 | 0.30 | A | 810 | A | 17 | A |
| Example 11 | 0.23 | A | 730 | B | 22 | B |
| Example 12 | 0.25 | A | 790 | A | 21 | B |
| Example 13 | 0.25 | A | 794 | A | 23 | B |
| Example 14 | 0.25 | A | 785 | A | 19 | A |
| Example 15 | 0.25 | A | 780 | A | 20 | A |
| Example 16 | 0.25 | A | 740 | B | 23 | B |
| Example 17 | 0.25 | A | 775 | A | 19 | A |
| Example 18 | 0.25 | A | 777 | A | 20 | A |
| Example 19 | 0.25 | A | 755 | A | 19 | A |
| Example 20 | 0.25 | A | 770 | A | 17 | A |
| Example 21 | 0.25 | A | 770 | A | 18 | A |
| Comparative Example 1 | 0.14 | A | 820 | A | 27 | C |
| Comparative Example 2 | 0.26 | A | 680 | C | 18 | A |
| Comparative Example 3 | 0.08 | A | 690 | C | 29 | C |
| Comparative Example 4 | 0.17 | A | 670 | C | 21 | B |
| Comparative Example 5 | 0.25 | A | 790 | A | 26 | C |
| Comparative Example 6 | 0.17 | A | 710 | B | 31 | C |
| Comparative Example 7 | 0.00 | A | 605 | C | 34 | C |
| Comparative Example 8 | 0.00 | B | — | — | — | — |

[3.2. Additive Manufacturing]

The results of the test of the additive manufacturing articles are shown in Table 3.

With respect to suitability for additive manufacturing, "A" indicates that the sample powder was able to be additive-manufactured without causing a crack, and "B" indicates that cracking occurred during the additive manufacturing, making the evaluation impossible.

With respect to wear resistance, "A" indicates that the hardness after the aging treatment was 750 Hv or higher, "B" indicates that the hardness after the aging treatment was 700 Hv or higher but less than 750 Hv, and "C" indicates that the hardness after the aging treatment was less than 700 Hv.

The following can be seen from Table 3.

(1) Comparative Example 1 showed satisfactory suitability for additive manufacturing and satisfactory wear resistance. However, Comparative Example 1 was low in V-attack resistance as stated above.

(2) Comparative Examples 2 to 4 had low wear resistance. The reasons for this are the same as those for the overlay welding layers.

(3) Comparative Examples 5 and 6 showed satisfactory suitability for additive manufacturing and satisfactory wear resistance. However, Comparative Examples 5 and 6 were low in V-attack resistance as stated above.

(4) Comparative Example 7 was low in wear resistance. The reasons for this are the same as those for the overlay weld layer.

(5) Comparative Example 8 had poor suitability for additive manufacturing besides having poor suitability for overlay welding. This is because due to the too high C content, the alloy had too high a hardness during overlay welding and additive manufacturing and cracked, making the evaluation impossible.

(6) Examples 1 to 21 were each excellent in terms of suitability for additive manufacturing and wear resistance.

TABLE 3

| | Suitability for additive manufacturing Evaluation | Wear resistance (hardness) 600° C. aging × 16 hr | |
|---|---|---|---|
| | | Hv (average for five test pieces) | Evaluation |
| Example 1 | A | 782 | A |
| Example 2 | A | 711 | B |
| Example 3 | A | 790 | A |
| Example 4 | A | 785 | A |
| Example 5 | A | 765 | A |
| Example 6 | A | 770 | A |
| Example 7 | A | 795 | A |
| Example 8 | A | 790 | A |
| Example 9 | A | 740 | B |
| Example 10 | A | 800 | A |
| Example 11 | A | 733 | B |
| Example 12 | A | 794 | A |
| Example 13 | A | 800 | A |
| Example 14 | A | 770 | A |
| Example 15 | A | 780 | A |
| Example 16 | A | 735 | B |
| Example 17 | A | 770 | A |
| Example 18 | A | 770 | A |
| Example 19 | A | 760 | A |
| Example 20 | A | 760 | A |
| Example 21 | A | 760 | A |
| Comparative Example 1 | A | 825 | A |
| Comparative Example 2 | A | 690 | C |
| Comparative Example 3 | A | 690 | C |
| Comparative Example 4 | A | 650 | C |
| Comparative Example 5 | A | 770 | A |
| Comparative Example 6 | A | 720 | B |
| Comparative Example 7 | A | 620 | C |
| Comparative Example 8 | B | — | — |

[3.3. Overlay Welding Using Welding Wires]

In cases where overlay welding was conducted using the welding wires of Examples 1 to 21, the overlay weld layers after the aging treatment each had a hardness of 700 Hv or higher.

Embodiments of the present invention were described above in detail but the invention is not limited to the embodiments in any way. The embodiments can be variously modified within the gist of the present invention.

The present application is based on Japanese Patent Application No. 2020-091747 filed on May 26, 2020, and the contents thereof are incorporated herein by reference.

INDUSTRIAL APPLICABILITY

The Ni-based alloy according to the present invention can be used, for example, as a material for overlay weld layers to be deposited on the valve-seat-side surface and/or fire-contact surface of each of the exhaust valves of an engine for ships or as a material for overlay weld layers to be deposited on surfaces of cutting tools.

What is claimed is:

1. An Ni-based alloy product which is in a form of powder, made of an Ni-based alloy consisting of:
   $0.3 \leq C \leq 1.0$ mass %;
   $36.0 \leq Cr \leq 50.0$ mass %; and
   $3.0 \leq Al \leq 7.0$ mass %,
   with the balance being Ni and unavoidable impurities.

2. A method for producing an Ni-based alloy product, the method comprising: a raw-material mixing and melting step of mixing and melting raw materials that have been put together so as to obtain the Ni-based alloy according to claim 1 to form a melt; and an atomization step of atomizing the melt to obtain an Ni-based alloy product which is in a form of powder.

3. An Ni-based alloy product, which is in a form of powder, made of an Ni-based alloy consisting of:
   $0.3 \leq C \leq 1.0$ mass %;
   $36.0 \leq Cr \leq 50.0$ mass %;
   mass %; and
   at least one member selected from the group consisting of:
   $Mo \leq 2.0$ mass %;
   $W \leq 2.0$ mass %;
   $Fe \leq 5.0$ mass %;
   $Cu \leq 2.0$ mass %,
   $B \leq 0.0100$ mass %;
   $Nb \leq 1.0$ mass %;
   $Ti \leq 1.0$ mass %;
   $V \leq 0.5$ mass %;
   $Ta \leq 0.5$ mass %;
   $Zr \leq 0.1$ mass %; and
   $Hf \leq 0.1$ mass %,
   with the balance being Ni and unavoidable impurities.

4. A method for producing an Ni-based alloy product, the method comprising:
- a raw-material mixing and melting step of mixing and melting raw materials that have been put together so as to obtain the Ni-based alloy according to claim 3 to form a melt; and
- an atomization step of atomizing the melt to obtain an Ni-based alloy product which is in a form of powder.

5. The Ni-based alloy according to claim 3, further satisfying
$0.0005 \leq B \leq 0.0100$ mass %.

* * * * *